United States Patent Office.

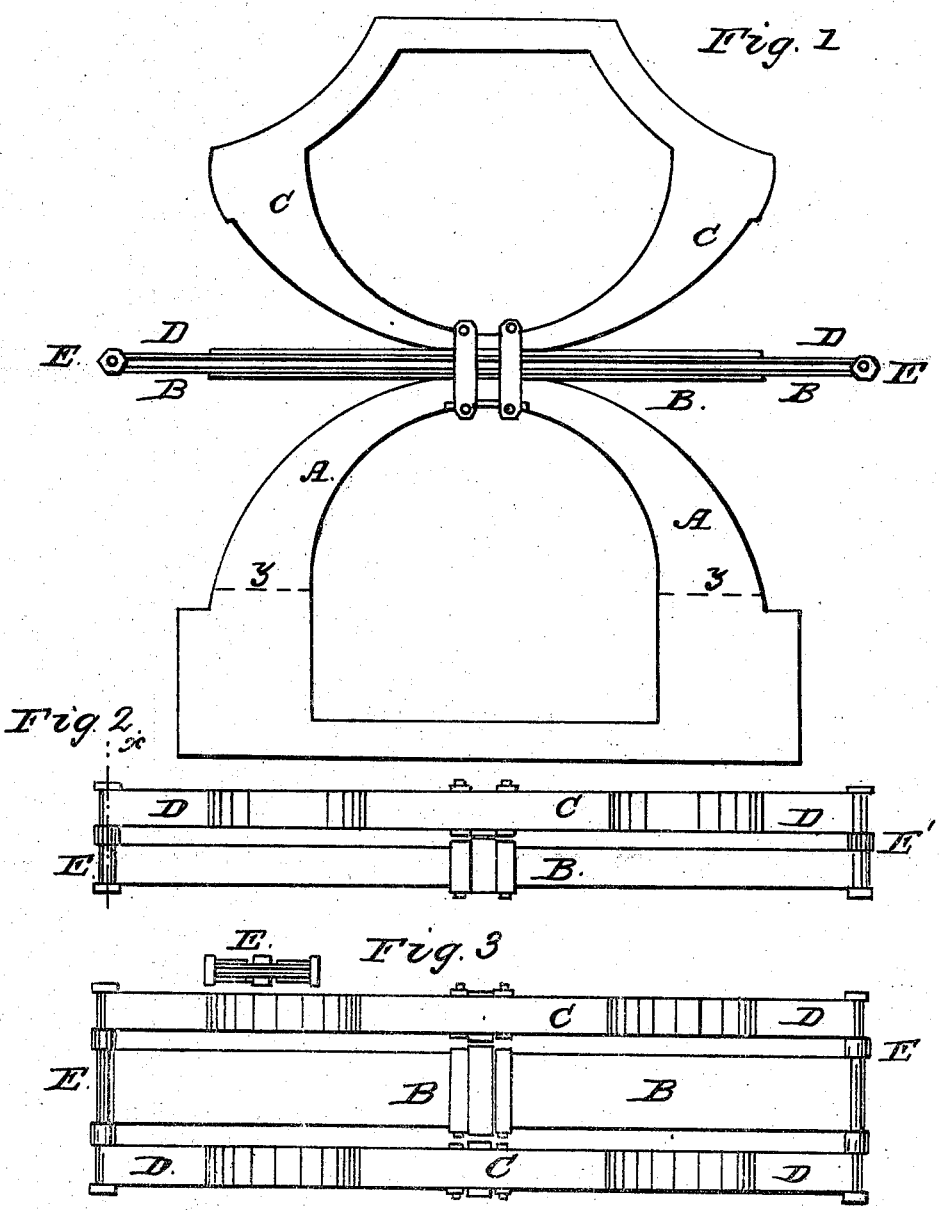

ALLYN E. WOLCOTT, OF CHICAGO, ILLINOIS, ASSIGNOR TO HIMSELF AND ISAAC SIMMONS, OF BALTIMORE, MARYLAND.

Letters Patent No. 90,144, dated May 18, 1869.

IMPROVEMENT IN CARRIAGE-SPRINGS.

The Schedule referred to in these Letters Patent and making part of the same.

*To all whom it may concern:*

Be it known that I, ALLYN E. WOLCOTT, of Chicago, in the county of Cook, and State of Illinois, have invented a new and useful Improvement in Metallic Springs; and I do hereby declare the following to be a full, clear, and exact description of the same, reference being had to the accompanying drawings, and to the letters and figures marked thereon, which form a part of this specification, and in which—

Figure 1 represents a side elevation of my improved spring;

Figure 2, a top view of the same;

Figure 3, a sectional view at the line $x$ in fig. 2; and

Figure 4, a top view, showing an additional set of springs.

The nature of my invention consists in the combination of two or more sets of straight metallic springs resting upon curved bearings, and connected by rods, as hereafter fully described.

To enable those skilled in the art to understand how to manufacture and use my invention, I will proceed to describe the same with particularity.

The same letters of reference refer to the corresponding parts in the different figures.

In the annexed drawing—

A represents a curved bearing; and B, a straight resilient plate or spring, the construction and operation of which are fully set forth and described in my application for a patent for an improvement in metallic springs, of even date herewith.

The curved bearings C and springs D are constructed the same as A and B, but the bearing is inverted, so as to be above the spring.

The ends of the springs are attached to the same movable rod E, and separated by washers E', as clearly shown in the drawing.

There may be more than two sets of springs, as shown in fig. 4, but when there are, each alternate bearing should be inverted.

It will be observed that by this combination of springs, the bearings are allowed to pass by each other as the weight is applied, and as the connecting-rod E is movable, they may pass by the entire length of the diameter of the circle, which describes the curve of the face of the bearings A and C in case said bearings are semicircles, thereby giving twice the motion to the weight that could be given in any other way.

The red lines $z$ indicate the base of the curved bearings. The bearings may be supported in any suitable manner.

Having thus fully described the construction and operation of my invention,

What I claim, and desire to secure by Letters Patent, is—

The combination of two or more sets of metallic springs B and D, and their attendant curved bearings A and C, and connecting-rods E, when constructed and arranged so as to operate substantially as shown and specified.

ALLYN E. WOLCOTT.

Witnesses:
LEWIS L. COBURN,
J. L. COBURN.